(12) United States Patent
Torgersen et al.

(10) Patent No.: US 8,490,115 B2
(45) Date of Patent: Jul. 16, 2013

(54) AMBIENT STATE FOR ASYNCHRONOUS METHODS

(75) Inventors: Mads Torgersen, Issaquah, WA (US);
Stephen H. Toub, Seattle, WA (US);
Eric L. Eilebrecht, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/277,762

(22) Filed: Oct. 20, 2011

(65) Prior Publication Data

US 2013/0104148 A1    Apr. 25, 2013

(51) Int. Cl.
*G06F 13/00* (2006.01)

(52) U.S. Cl.
USPC .......................................................... 719/320

(58) Field of Classification Search
USPC .......................................................... 719/320
See application file for complete search history.

(56) References Cited

U.S. PATENT DOCUMENTS

| | | | | |
|---|---|---|---|---|
| 5,937,186 | A * | 8/1999 | Horiguchi et al. | 712/244 |
| 6,779,180 | B1 * | 8/2004 | Palm | 718/100 |
| 7,676,662 | B2 * | 3/2010 | Gardner | 712/227 |
| 7,784,057 | B2 * | 8/2010 | Davis et al. | 718/108 |
| 2010/0313184 | A1 | 12/2010 | Gustafsson et al. | |

OTHER PUBLICATIONS

"Use Asynchronous Execution Pattern in asp.net" Retrieved Date: Jul. 13, 2011, pp. 5.
Chrysanthakopoulos, et al., "An Asynchronous Messaging Library C#", Synchronization and Coordination in Object Orientated Lanugaes (SCOOL Conference), Oct. 7, 2005, pp. 1-9.
Lowy, Juval, "Introducing System.Transactions in the .net Framework 2.0", MSDN, Dec. 2005, pp. 26.
Syme, et al., "The F# Asynchronous Programming Model", Proceedings of the 13th international conference on Practical aspects of declarative languages (PADL), Jan. 24-25, 2011, pp. 175-189.
Bracha, Gilad, "Objects as Software Services", Aug. 7, 2006, pp. 1-13.
"C# with .net", Retrieved Date: Jul. 14, 2011, pp. 7.

* cited by examiner

*Primary Examiner* — Andy Ho

(57) ABSTRACT

A method of providing asynchronous programming support at run time for scope-based ambient state at a method call is disclosed. In response to the method call, an asynchronous method stack frame is created along with ambient state for the asynchronous method call. In one example of the method, a current frame of a method stack is captured. A new frame is instantiated by setting a previous reference of the new frame to the current frame and moving data from the previous frame into the current frame. One example of instantiating the new frame includes pushing the current frame onto the stack. In another example, the new frame is lazily created when changes have been made. A state machine used to transform the synchronously-created method into an asynchronous method is moved from a current state to a next state. The captured frame is restored.

20 Claims, 3 Drawing Sheets

AMBIENT STATE FOR ASYNCHRONOUS METHODS

BACKGROUND

Computer applications often call methods to perform an operation outside of the main process. Examples include accessing a resource, offloading an compute-intensive calculation, and reading files from storage. Generally, the approaches used to perform the methods include synchronous operations and asynchronous operations. Synchronous operations generally stall execution of main application while the method performs the task. Stalling the application runs the risk of holding onto valuable computing resources while the synchronous operation completes. The main application is resumed after the method returns a result. Asynchronous operations, in contrast, allow the application to continue to perform work while the method performs the task. Asynchronous operations are typically preferred over synchronous operations whenever the application calls a method that will wait a non-deterministically and relatively long time, such as accessing resources on a computer network. Further, research has demonstrated that asynchronous operations provide superior memory usage and throughput over synchronous operations.

Despite the advantages of using asynchronous operations, developers often prefer to use synchronous programming models to asynchronous programming models. Developers have found asynchronous programming models to be difficult to understand and implement as compared to the commonly used and relatively straightforward synchronous programming model. Traditionally, asynchronous programming in modern programming languages was implemented with callbacks. Recent advancements in language design have enabled asynchronous programming models to use the same sequential control flow constructs of synchronous code. But even with improvements in asynchronous program support, many capabilities of synchronous programming mechanisms remain unavailable in asynchronous programming.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One example of a synchronous programming feature that is not supported in an asynchronous programming model is thread-local state does not provide scope-based ambient state. Such ambient state is useful, for example, in providing scope-based transactions such that any database calls made within that scope implicitly enlist in the ambient transaction established and later committed by the scoping construct. Currently, scope-based ambient state is created manually with difficult to understand and implement asynchronous programming models.

The disclosure is directed to a method of providing asynchronous programming support at run time for scope-based ambient state at a method call. In response to the method call, an asynchronous method stack frame is created along with ambient state for the asynchronous method call. In one example of the method, a current frame of a method stack is captured. A new frame is instantiated by setting a previous reference of the new frame to the current frame and moving data from the previous frame into the current frame. In one example, the data is copied from the previous frame into the current frame. One example of instantiating the new frame includes pushing the current frame onto the stack. In another example, the new frame is lazily created when changes have been made. A state machine used to transform the synchronously-created method into an asynchronous method is moved from a current state to a next state. The captured frame is restored, for example, by popping the current method stack frame from the stack.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
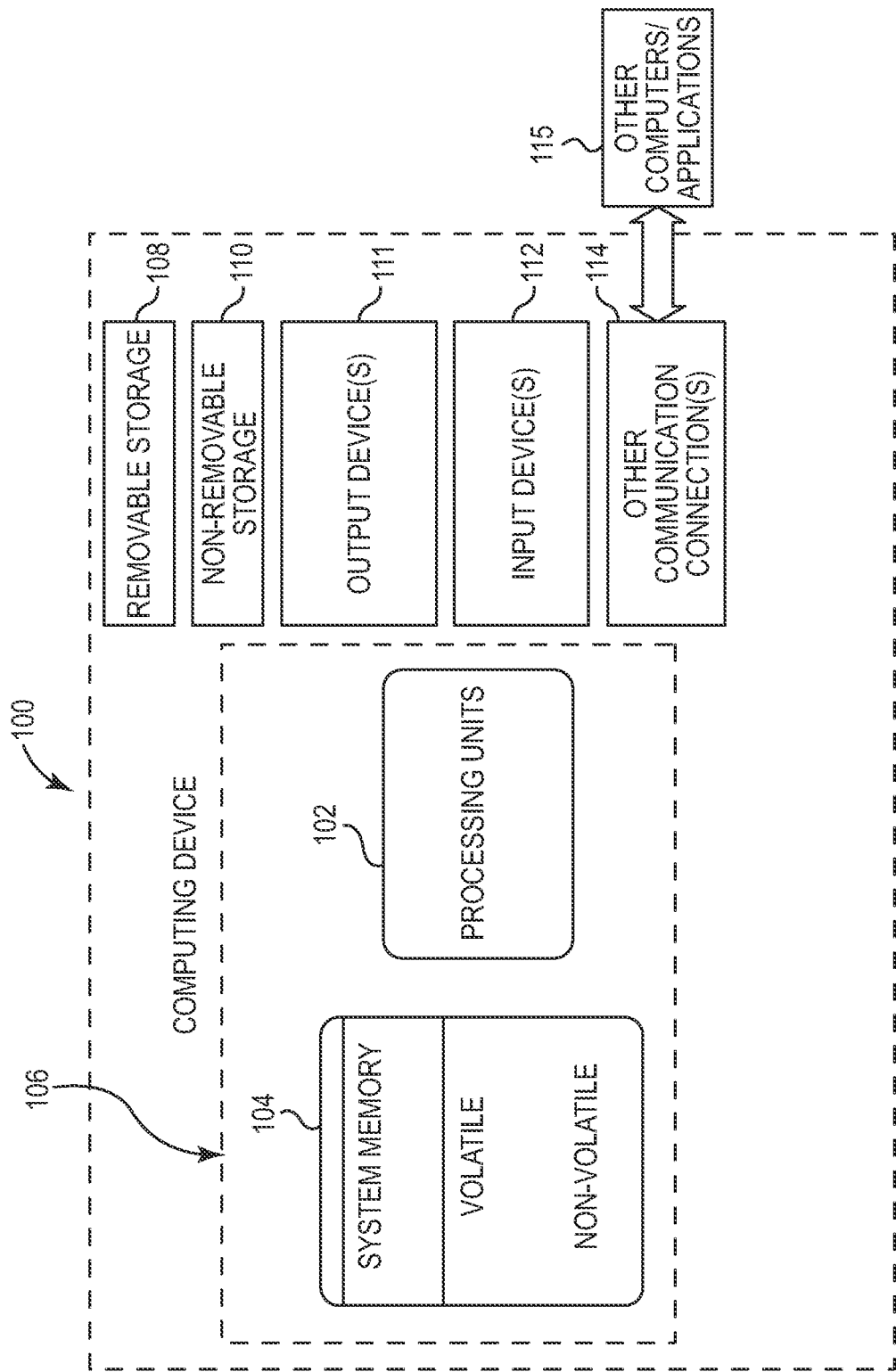
FIG. 1 is a block diagram illustrating an example of a computing device.

FIG. 1 illustrates an exemplary computer system that can be employed in an operating environment and used to host or run a computer application included on one or more computer readable transient storage mediums storing computer executable instructions for controlling the computer system, such as a computing device, to perform a method. The computer system can also be used to develop and/or run computer applications having asynchronous operations using sequential control flow constructs of synchronous code.

The exemplary computer system includes a computing device, such as computing device 100. In a basic configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

The computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread.

An asynchronous operation may execute in a thread separate from the main application thread. When an application calls methods to perform an operation asynchronously, the application can continue executing on its thread while the asynchronous method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

In one example, the computing device 100 includes a software component referred to as a managed environment that provides for asynchronous programming support. The managed environment can be included as part of the operating system or can be included later as a software download. Typically, the managed environment includes pre-coded solutions to common programming problems to aid software developers to create applications, such as software programs, to run in the managed environment. Examples of managed environments can include an application framework or platform available under the trade designation .NET Framework available from Microsoft, Inc. of Redmond, Wash. U.S.A, and Java now from Oracle Corporation of Redwood City, Calif., U.S.A., as well as others and can include web application frameworks often designed to support the development of dynamic websites, web applications and web services.

Figure 2:
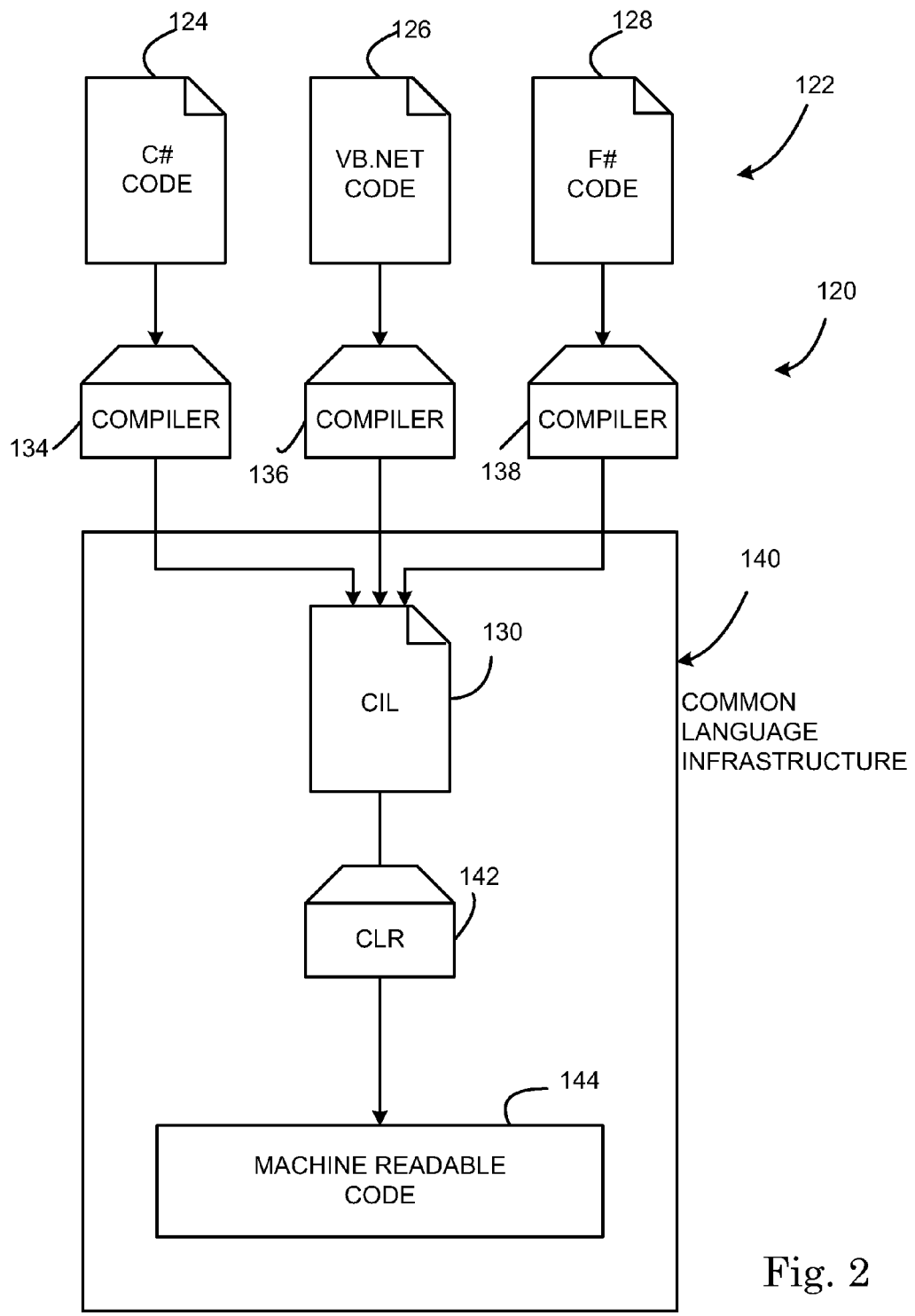
FIG. 2 is a block diagram illustrating an example of a managed environment configured to provide asynchronous programming support for a computer application running on the computing device of FIG. 1.

FIG. 2 illustrates an example of a managed environment 120 suitable for operation with the computing device 100 to provide asynchronous programming support. The managed environment 120 is configured to accept programs written in a high-level compatible code of one or more programming languages 122 to be used on different computer platforms without having to be rewritten for specific architectures. For example, the managed environment can accept programs written in compatible programming languages such as C# (C-sharp) code 124, a visual basic type language such as VB.NET code 126, and several other languages, for example F# (F-sharp) code 128. Several programming languages include the ability to author asynchronous methods using sequential control flow constructs of synchronous code.

Typically, each program written in a compatible language will be compiled into a second platform-neutral language 130—with corresponding language-specific compilers 134, 136, 138, respectively—within a Common Language Infrastructure (CLI) 140. In the case of the .NET Framework, the second platform-neutral language 130 is often referred to as the Common Intermediate Language (CIL). The program in the second platform-neutral language 130 is provided to a runtime compiler 142, such as the Microsoft Common Language Runtime (CLR) in the .NET Framework, that compiles the program in the second platform-neutral language 130 into a platform-specific machine-readable code 144 that is executed on the current platform or computing device. Other managed environments or other implementations could facilitate the execution of the intermediate code 130 other than with the runtime compiler 142 such as with interpretation or another method, or with a combination of the two or more methods. A compiler with constructs to express asynchronous methods with sequential flow constructs, such as the language-specific compilers 134, 136, 138. It is contemplated that a runtime compiler 142 could be configured to convert asynchronous methods authored with sequential flow constructs into an asynchronous implementation.

A compiler, such as language-specific compilers 134, 136, 138 in the example, applies a state machine transformation to convert the asynchronous operation written in a sequential flow construct into an asynchronous implementation. The implementation suspends for the results of asynchronous operations, where the operation is represented by a handle to that operation. An example handle in the .NET Framework would be a .NET Task or Task<TResult>. In one particular example, the compiler transforms the method such that what comes after an await is hooked-up as a callback/continuation onto the handle that is invoked when the asynchronous operation completes.

The language-specific compiler, in this example, produces code so that upon entrance to an asynchronous method, an asynchronous method builder is instantiated, and upon completion of an asynchronous method, the builder is completed. For example, the asynchronous method written in a compatible programming language for the .NET Framework, (i.e., developer's written code):

```
public async Task FooAsync( )
{
    ...
    return;
}
``` would translate into calls—with the asynchronous programming support—that can be represented by or akin to the following pseudo code (i.e., translated code):

```
public Task FooAsync( )
{
    var stateMachine = new FooAsyncStateMachine( );
    stateMachine.builder = AsyncTaskMethodBuilder.Create( );
    ...
    stateMachine.MoveNext( );
    return stateMachine.builder.Task;
}
private class FooAsyncStateMachine
{
    internal void MoveNext( )
    {
        try
        {
            ... // rewritten implementation of user's FooAsync( )
            this.builder.SetResult( );
        }
        catch(Exception exc) { this.builder.SetException(exc); }
    }
    ...
}
```

The method of the developer's written code is transformed into a stub method that initializes the asynchronous method's state and delegates to an internal MoveNext implementation that contains the transformed logic based on the developer's written code. The state machine associated with the transformed asynchronous method is moved from a current state to a next state in this example with the MoveNext call. With this asynchronous method, there may be suspension points on asynchronous operations such as:

```
Task t = BarAsync( );
await t;
```

This can get translated akin to:

```
Task t = BarAsync( );
TaskAwaiter awaiter = t.GetAwaiter( );
if ( !awaiter.IsCompleted)
{
    this.NextState = Label42;
    awaiter.OnCompleted(this.MoveNextDelegate);
    return;
    Label42:
}
awaiter.GetResult( );
```

An asynchronous method written using language-provided constructs with normal sequential control flow constructs also provides a developer with the ability to interact with ambient state that is only available to this asynchronous method and any code logically invoked by this asynchronous method. Such ambient state could be used, for example, to enable ambient transactions that database operations automatically enlist in. Consider the following example:

```
public async Task UpdateDatabaseAsync(string productName, int additionalUnits)
{
    Transaction.Current = new Transaction( );
    try
    {
        var conn = new SqlConnection(CONNECTION_STRING);
        await conn.OpenAsync( ); // asynchronous wait for connection to open
        // asynchronously retrieve current # of units
        int currentUnits = await GetCurrentUnitCountAsync(conn, productName);
        // asynchronously update # of units
        await SetCurrentUnitCountAsync(
            conn, productName, currentUnits+additionalUnits);
        Transaction.Current.Commit( ); // commit the transaction
    }
    catch
    {
        Transaction.Current.Rollback( );
        throw;
    }
    finally
    {
        Transaction.Current = null;
    }
}
```

In this example, multiple individual requests are made against a database in order to get the current number of available units of some product, add additional unit count to that number, and write it back to the database. These operations are preferably done atomically or else the database information could be corrupted. For example, two concurrent calls are made to each add 5 units. Each call gets the current number and finds that it is 130, adds 5 to the current number to get 135, and then writes 135 back to the database, when in actuality the correct total is 140. To address this issue, a database transaction is used. But to avoid having to explicitly pass the transaction object into each database operation the transaction is published in an ambient fashion such that the database library can access the current transaction from ambient state (e.g. a static Transaction.Current property in the .NET Framework). The number of units are retrieved and updated asynchronously, in the example.

In synchronous programming, thread-local state may be used to back the ambient state. Consider the example of synchronous code:

```
[ThreadStatic] // provides one instance of state per thread
private static Transaction t_current;
public static Transaction Current
{
  get { return t_current; }
  set { t_current = value; }
}
```

Thread-local state may be used to back this ambient state because the entire code inside of the try block will run on the same thread, and unrelated code does not run on that thread for the duration of the try block. Further, through the scoping mechanism of the try/catch/finally, the applicable data (1) is published to thread-local state prior to running the relevant code, (2) exists throughout all of the relevant code running, and (3) is then removed from thread-local state prior to running any code after the try/catch/finally construct.

The same backing mechanism, however, cannot be used as-is for asynchronous programming. The example asynchronous method is translated at runtime into a series of callbacks, and each callback could end up running on a different thread. For example, a thread pool is used to run the callbacks as the asynchronous operations that are being awaited are completed. Any data published into thread-local state exists for the one thread where the data was published and is not automatically available on other threads where the callbacks executed. Further, in an environment such as a thread pool where work is being multiplexed onto the one or more threads in the pool, any data published to thread-local state would be visible to subsequent unrelated work that executed on the thread where the thread-local state data was published. In the case of a transaction, completely unrelated database operations that happen to run on that thread where Transaction-.Current was set would see that transaction and attempt to use it. All of this leads to functional incorrectness and security holes.

Accordingly, thread-local state does not provide scope-based ambient state in current asynchronous programming support. Such a state is useful, for example, in providing scope-based transaction such that any database calls made within that scope implicitly enlist in the ambient transaction established and later committed by the scoping construct. Currently, scope-based ambient state is created manually with difficult to understand and implement asynchronous programming models.

An AsyncMethodState enables scope-based ambient state for asynchronous methods in which sequential control flow constructs of synchronous code are allowed. In addition, ambient state can be propagated across asynchronous suspension/resumption points without unintended exposure of the state.

AsyncMethodState class provides a public façade for access to the asynchronous method state, such as in the following example:

```
public class AsyncMethodState
{
  // For getting and setting "current" data
  public static object Get(string key);
  public static void Set(string key, object value);
  // For manipulating AsyncMethodState frames
  public static AsyncMethodState NewFrame( );
  public static void PushFrame(AsyncMethodState frame);
  public static void PopFrame(AsyncMethodState frame,
    bool restorePrevious);
  ... // private implementation
}
```

Figure 3:
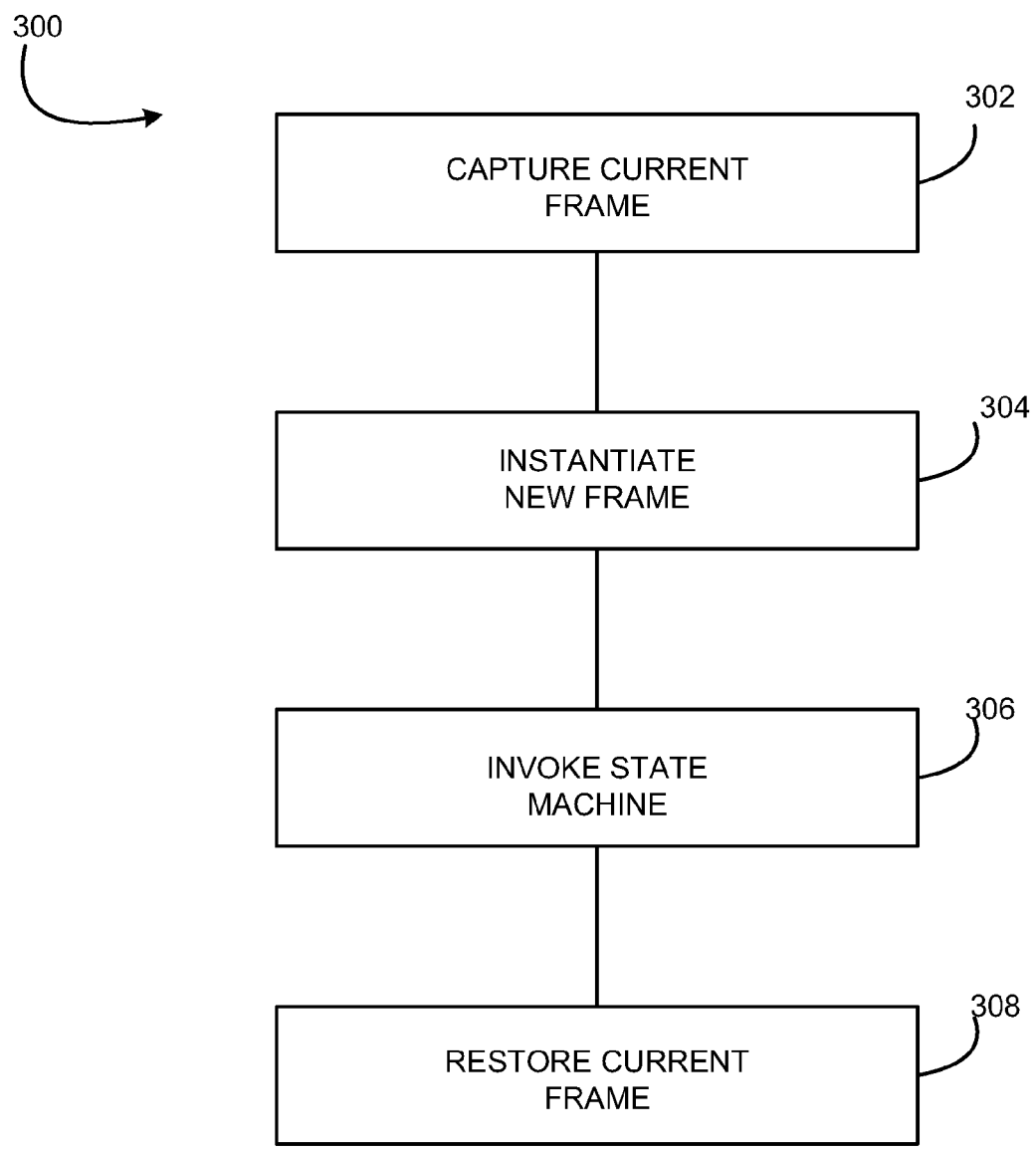
FIG. 3 is a block diagram illustrating an example method of providing asynchronous programming support.

FIG. 3 illustrates a method 300 used with the AsyncMethodState at runtime to provide asynchronous programming support for scope-based ambient state. At the initial asynchronous method call, a new asynchronous method stack frame is created that points to the current frame by capturing a current frame at 302 and instantiating a new frame at 304. The frames can be created and captured in memory 104 of the computing device 100. In the example, a current frame of the asynchronous method stack frame is captured at 302. A new frame is instantiated at 304 by setting the previous reference of the new frame to the current frame and setting the new frame to be the current reference; and also by creating, such as copying, the data from the previous frame into the current frame. The state machine associated with the asynchronous method is moved from a current state to a next state at 306 such as with an initial MoveNext is invoked on the state machine. The current frame is restored from the previously captured current frame at 308.

The preamble for an asynchronous method serves to provide a new builder, which is stored into the state machine object for the asynchronous method. The compiler-generated code also uses the NewFrame method to create and push a new AsyncMethodState frame onto the implicit stack maintained by the AsyncMethodState class in the following example:

```
public Task FooAsync( )
{
  var stateMachine = new StateMachine( );
  stateMachine.builder = AsyncTaskMethodBuilder.Create( );
  stateMachine.asyncState = AsyncMethodState.NewFrame( );
  ...
  stateMachine.MoveNext( );
  AsyncMethodState.PopFrame(stateMachine.asyncState,
    restorePrevious:true);
  return stateMachine.builder.Task;
}
```

Exiting an asynchronous method applies the builder's SetResult or SetException method. This frame is also popped from the implicit AsyncMethodState stack. In the example, the frame is popped from the implicit AsyncMethodState stack if the asynchronous method encounters an await that yields/suspends; otherwise the popping that occurs in the stub method will suffice:

```
try
{
  ...
  if (this.SuspendedAtLeastOnce)
  {
    AsyncMethodState.PopFrame(this.asyncState, restorePrevious:false);
```

```
    }
    this.builder.SetResult(result);
}
catch(Exception exc) { this.builder.SetException(exc); }
```

Instead of pushing or popping the stack as described, the frame can be lazily instantiated. For example, the stack can be marked rather than exited. In entering, the scope is set to be immutable, and then the frame can be pushed and popped.

The above examples were directed to entering and exiting the asynchronous method. During an asynchronous method's execution, however, the method may also be suspended and resumed. Rather than exiting and entering ambient state at the suspension and resumption points, respectively, the ambient state persists at these points. Those points are also augmented with calls to pop and push the state, such as in the following example:

```
var awaiter = awaitable.GetAwaiter( );
if ( !awaiter.IsCompleted)
{
    this.NextState = Label42;
    awaiter.OnCompleted(this.MoveNextDelegate);
    if ( !this.IsFirstSuspension)
    {
        AsyncMethodState.PopFrame(this.asyncState, restorePrevious:false);
    }
    return;
Label42:
    AsyncMethodState.PushFrame(this.asyncState);
}
awaiter.GetResult( );
```

The frame for an asynchronous method is at the top of the AsyncMethodState stack while code within the asynchronous method, or that of any synchronous methods it calls to, is executing. Across suspension and resumption points, the ambient state for the call is preserved due to the method's AsyncMethodState being stored into the state machine object for the asynchronous method. In the example, the frame is popped if this is not the first suspension of this asynchronous method because the first suspension will occur during the initial synchronous call to the asynchronous method. Restoration of the stack is handled, in that case, by the stub method.

The AsyncMethodState maintains a thread-local stack of frames. Each of these frames—which can also be referred to as an AsyncMethodState instance—stores a dictionary of key/value pairs. The dictionary of key/value pairs provide the static Set/Get methods access to data, as in the following example:

```
public class AsyncMethodState
{
    ...
    [ThreadStatic]
    private static AsyncMethodState t_currentFrame;
    private readonly Dictionary<string,object> m_data;
    public static void Set(string key, object value)
    {
        AsyncMethodState curFrame = currentFrame;
        if (curFrame == null) throw new InvalidOperationException("No frame established for current method.");
        curFrame.m_data[key] = value;
    }
    public static object Get(string key)
    {
        AsyncMethodState curFrame = currentFrame;
        if (curFrame == null) throw new InvalidOperationException("No frame established for current method.");
        object item;
        if (curFrame.m_data.TryGetValue(key, out item)) return item;
        return null;
        // alternate solutions could throw an exception or set a result Boolean to false, e.g. bool TryGet(string, out object);
    }
}
```

In one particular example, the AsyncMethodState itself is a node in an immutable linked list, initialized as part of the call to NewFrame, which adds the new frame to the linked list. Adding a new frame to the linked list also copies the previous frame's data so as to make a snapshot of the data at the time of the method call available to the new frame. An example is provided below:

```
public class AsyncMethodState
{
    ...
    private readonly AsyncMethodState m_prev;
    private AsyncMethodState(AsyncMethodState previousFrame) // prevent external
instantiation with a private constructor
    {
        m_prev = previousFrame;
        m_data = m_prev == null ?
            new Dictionary<string,object>( ) : // no previous frame, so start fresh
            new Dictionary<string,object>(m_prev.m_data); // previous frame, so copy its data to this frame
    }
    public static AsyncMethodState NewFrame( )
    {
        var state = new AsyncMethodState(t_currentFrame);
        t_currentFrame = state;
        return state;
    }
}
```

In the above example, storing the m_prev enables popping this state off the top of the stack and restoring the previous method's state. PopFrame accepts a Boolean parameter that indicates whether to restore the previous state, which is used by the entry stub so the calling function sees the exact same state that was there upon calling the asynchronous method.

In other cases, a snapshot approach is used, such as illustrated in the following example:

```
public class AsyncMethodState
{
    ...
    public static void PopFrame(AsyncMethodState frame, bool restorePrevious)
    {
        if (frame == null) throw new ArgumentNullException("frame");
        if (t_currentFrame != frame) throw new InvalidOperationException("Specified frame is not at the top of the stack.");
        t_currentFrame = restorePrevious ? frame.m_prev : null;
    }
    public static void PushFrame(AsyncMethodState frame)
    {
        if (frame == null) throw new ArgumentNullException("frame");
        t_currentFrame = frame;
    }
}
```

Variations on the snapshot approach are also possible. For example, rather than copying all current state into a new frame's dictionary and having the Get method only look at the top frame's dictionary, an alternative solution is to have the Get method traverse the entire linked list of frames to look for the data in each frame and return the data from the first frame in which it is found. For this to work, the dictionary supports concurrent reads with writes (e.g., by using a ConcurrentDictionary in the .NET Framework), because multiple asynchronous methods could read ancestor frames state concurrently with that ancestor frame running and updating its own state. This approach also changes semantics slightly. With the snapshot approach, an asynchronous method sees the state of its ancestors at the moment it was called. With this approach, the asynchronous method will see changes made by its ancestors after its initial invocation.

Considering the above, the example of Transaction.Current could then be implemented with Transaction.Current implemented with the following example:

```
private readonly static string TRANSACTION_CURRENT_KEY = Guid.NewGuid( ).ToString( );
public static Transaction Current
{
  get { return (Transaction)AsyncMethodState.Get(TRANSACTION_CURRENT_KEY); }
  set { AsyncMethodState.Set(TRANSACTION_CURRENT_KEY, value); }
}
``` and that transaction information would be appropriately flowed.

The above examples are provided with the compiler responsible for pushing and popping. These examples, however, are not limited to functions of the compiler. The methods and examples can be implemented in a software framework or at some other intermediary level of support.

The mechanism for ambient state that is available within asynchronous methods, such that the entire body of the asynchronous method has access to this state as well as the ambient state present at the time the asynchronous method was invoked. Any ambient state created by this asynchronous method is visible to code called by the asynchronous method, but any asynchronous methods called by this asynchronous method are not able to manipulate or otherwise augment this method's state.

As an example, the following methods were provided with asynchronous programming support set forth in above.

```
public async Task AsyncMethodA( )
{
  AsyncMethodState.Set("Key1", "Dog");
  AsyncMethodState.Set("Key2", "Cat");
  var data1 = AsyncMethodState.Get("Key1");
  var data2 = AsyncMethodState.Get("Key2");
  Task t = AsyncMethodB( );
  var data3 = AsyncMethodState.Get("Key1");
  var data4 = AsyncMethodState.Get("Key2");
  await t;
  SyncMethodD( );
  var data5 = AsyncMethodState.Get("Key1");
  var data6 = AsyncMethodState.Get("Key2");
}
public async Task AsyncMethodB( )
{
  var data9 = AsyncMethodState.Get("Key1");
  var data10 = AsyncMethodState.Get("Key2");
```

```
  AsyncMethodState.Set("Key1", "Penguin");
  AsyncMethodState.Set("Key2", "Lion");
  var data11 = AsyncMethodState.Get("Key1");
  var data12 = AsyncMethodState.Get("Key2");
  await Task.Delay(1000);
  var data13 = AsyncMethodState.Get("Key1");
  var data14 = AsyncMethodState.Get("Key2");
}
public void SyncMethodC( )
{
  ThreadPool.QueueUserWorkItem(delegate
  {
    var data15 = AsyncMethodState.Get("Key1");
    var data16 = AsyncMethodState.Get("Key2");
  });
}
public void SyncMethodD( )
{
  var data17 = AsyncMethodState.Get("Key1");
  var data18 = AsyncMethodState.Get("Key2");
  AsyncMethodState.Set("Key1", "Zebra");
  AsyncMethodState.Set("Key2", "Elephant");
  var data19 = AsyncMethodState.Get("Key1");
  var data20 = AsyncMethodState.Get("Key2");
}
```

In this example, AsyncMethodA is invoked and sets Key1 and Key2 to Dog and Cat, respectively. AsyncMethodA retrieves the values of this asynchronous method state, such that data1=="Dog" and data2=="Cat".

AsyncMethodB is also invoked, which also gets the values from the asynchronous method state, and finds data9=="Dog" and data10=="Cat". The values Penguin and Lion are written into the key, respectively, and upon reading back the values, data11=="Penguin" and data12=="Lion" are found. AsyncMethodB asynchronously awaits an operation that will not complete for a thousand milliseconds (one second). Control is returned to AsyncMethodA, which proceeds to examine the keys and to store the results. AsynchMethodA finds that data3=="Dog" and data4=="Cat" because the ambient state of AsyncMethodB is not visible to its caller, i.e., AsyncMethodA. AsyncMethodA awaits the completion of its prior invocation of AsyncMethodB. After the one-second delay of AsyncMethodB completes, the remainder of its code gets scheduled for execution. AsyncMethodB checks Key1 and Key2, and finds that data13=="Penguin" and data14=="Lion". At this point, AsyncMethodB completes, allowing for the remainder of AsyncMethodA to be scheduled.

In the interim, some code elsewhere invokes SyncMethodC, which schedules some work to be run on the thread pool where all of these other invocations have been running. This work item in one example can end up running on the same thread that was just running AsyncMethodB. When this work item queries the keys, it finds that both data15 and data16 are null, because no state from other asynchronous methods are visible to this unrelated method.

As AsyncMethodA continues running, it invokes the synchronous method SyncMethodD. SyncMethodD checks the keys, and finds that data17=="Dog" and data18=="Cat. SyncMethodD then overwrites Key1 and Key2 with Zebra and Elephant respectively, and when it queries back the keys, it finds that data19=="Zebra" and data20=="Elephant". SyncMethodD then exits and returns control to AsyncMethodA. AsyncMethodA queries the keys, and finds that data5=="Zebra" and data6=="Elephant".

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computing device implemented method to provide asynchronous programming support for an asynchronous method, the method comprising:
   capturing a method stack current frame of an asynchronous method stack frame;
   instantiating a new frame by setting a previous reference of the new frame to the current frame and setting the new frame to be a current reference and moving data from the previous frame into the current frame;
   moving a state machine associated with the asynchronous method from a current state to a next state; and
   restoring the captured frame.

2. The method of claim 1 wherein the frames are in memory.

3. The method of claim 1 wherein instantiating the new frame includes pushing the current frame onto a stack.

4. The method of claim 1 wherein restoring the captured frame includes popping the captured frame.

5. The method of claim 4 wherein the captured frame is popped if the asynchronous method encounters a suspension point that yields and suspends the asynchronous method.

6. The method of claim 1 wherein the asynchronous method call encounters awaits.

7. The method of claim 1 wherein ambient state of the asynchronous method persists at suspension and resumption points in the asynchronous method.

8. The method of claim 7 wherein the awaits are augmented with calls to push and pop the ambient state.

9. The method of claim 1 wherein the method is performed in response to a call of the asynchronous method.

10. The method of claim 1 wherein the method is performed during run-time of the asynchronous method.

11. A computing device implemented method to provide asynchronous programming support for scope-based ambient state at an asynchronous method call, the method comprising:
    creating an asynchronous method stack frame;
    capturing a current frame of the asynchronous method stack frame;
    instantiating a new frame by setting a previous reference of the new frame to the current frame and moving data from the previous frame into the current frame;
    moving a state machine associated with the asynchronous method call from a current state and a next state; and
    restoring the captured frame.

12. The method of claim 11 wherein the creating the asynchronous method stack frame is in response to the method call.

13. The method call of claim 11 wherein the asynchronous method stack frame points to the current frame.

14. The method of claim 11 wherein the creating data from the previous frame includes copying data from the previous frame into the current frame.

15. The method of claim 11 and further comprising maintaining a thread-local stack of frames.

16. The method of claim 15 wherein each thread-local stack of frames stores a dictionary of key and value pairs.

17. The method of claim 11 wherein the new frame is added to a linked list of frames.

18. The method of claim 11 wherein ambient state is visible to code called by the asynchronous method but other asynchronous methods cannot manipulate or augment the ambient state.

19. A computing device implemented method at runtime of a process to provide asynchronous programming support for scope-based ambient state at an asynchronous method call, the method comprising:
    creating an asynchronous method stack frame in response to the method call;
    creating an ambient state for the asynchronous method call;
    capturing a current method stack frame of the asynchronous method stack frame by pushing the current method stack frame onto a stack;
    instantiating a new frame by setting a previous frame to the current frame and copying data from the previous frame into the current frame;
    moving a state machine associated with the method call from a current state to a next state; and
    restoring the captured method stack frame by popping the current method stack frame from the stack.

20. The method of claim 19 wherein the method is performed as part of a library.

* * * * *